April 3, 1928.
L. R. HUPP
1,664,925
PLANTER
Filed Jan. 22, 1926
2 Sheets-Sheet 1
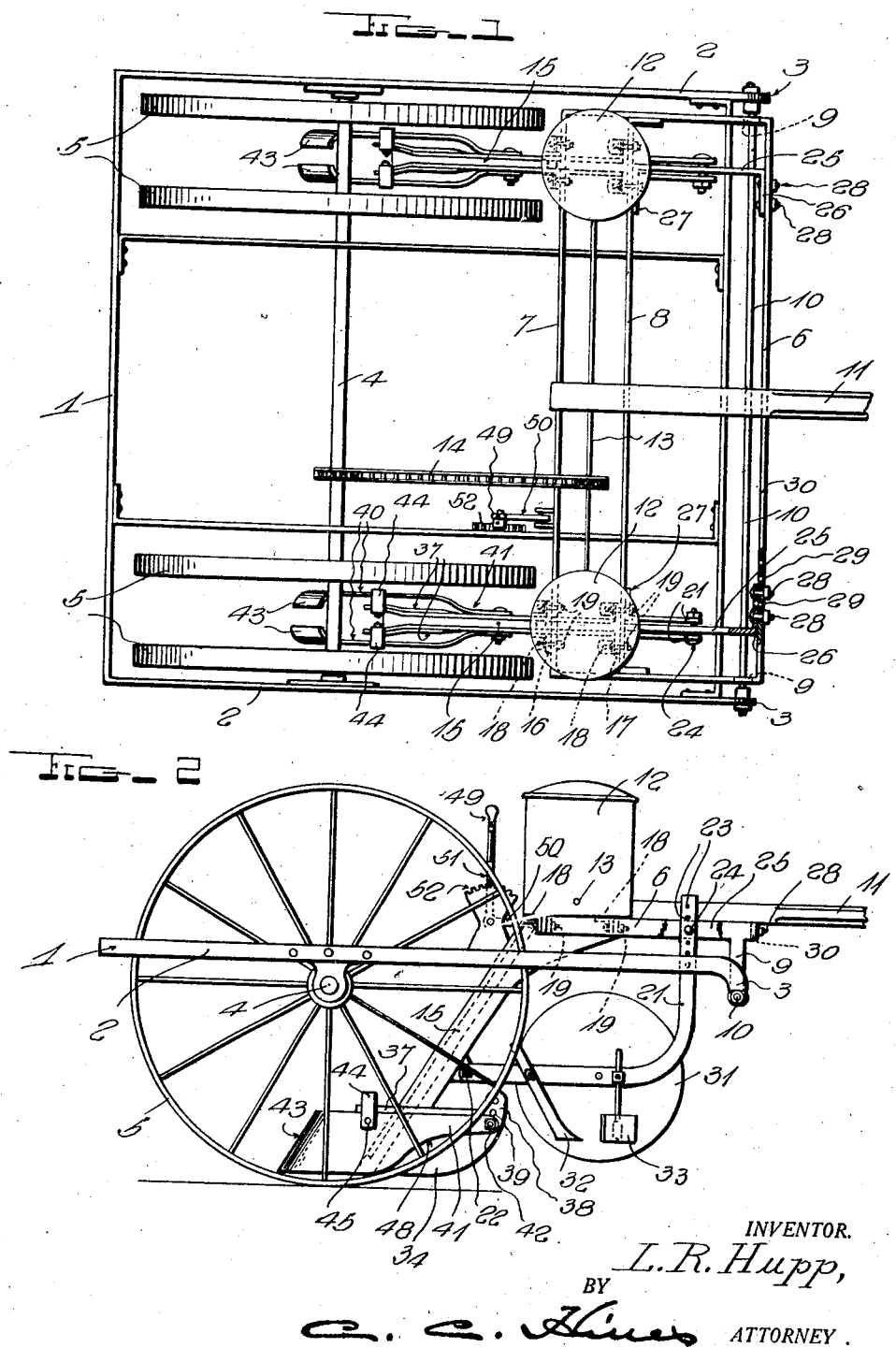
INVENTOR.
L. R. Hupp,
BY
ATTORNEY.

April 3, 1928.
L. R. HUPP
PLANTER
Filed Jan. 22, 1926
1,664,925
2 Sheets-Sheet 2
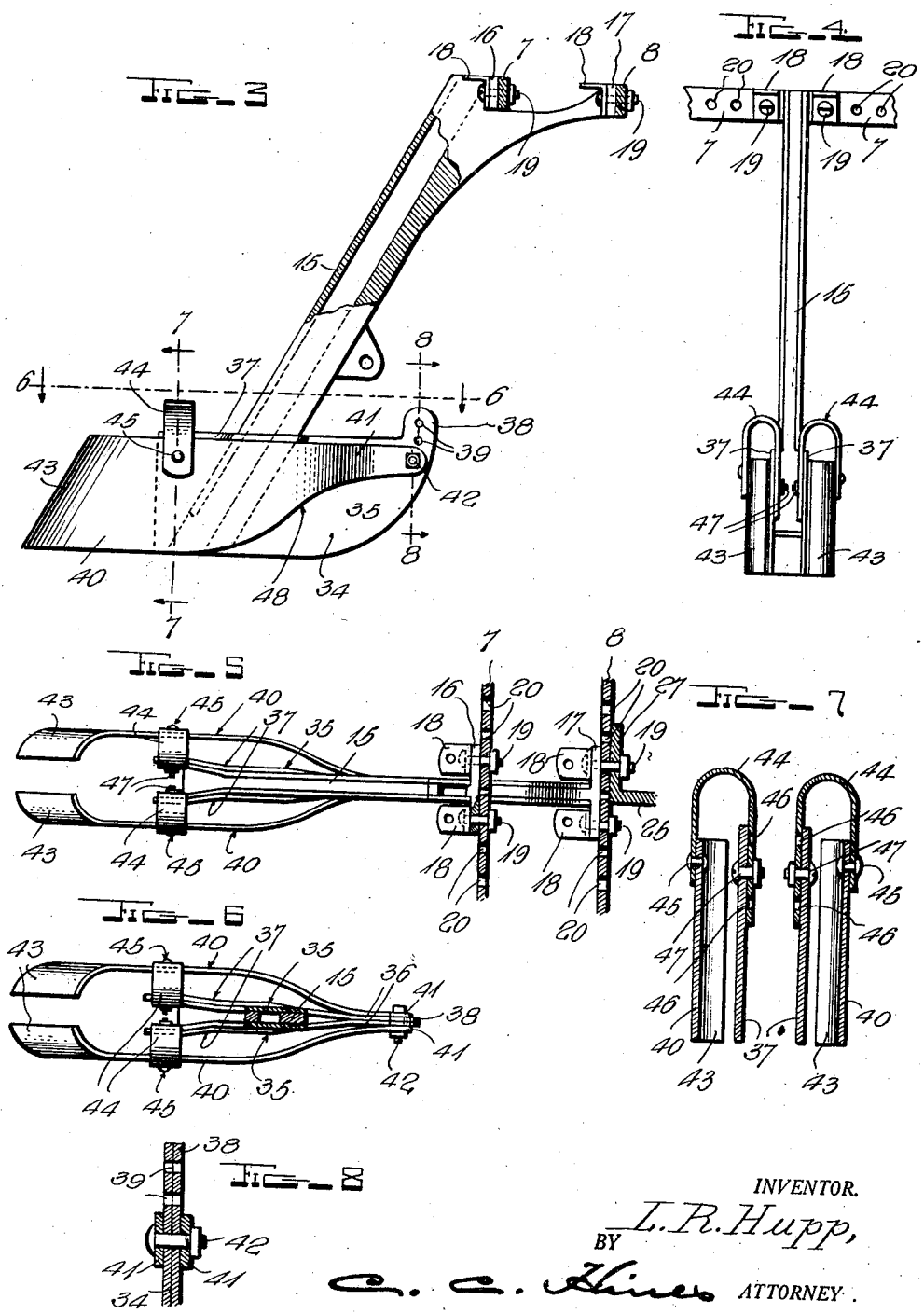
INVENTOR.
L. R. Hupp,
BY
ATTORNEY.

Patented Apr. 3, 1928.

1,664,925

UNITED STATES PATENT OFFICE.

LONZO R. HUPP, OF URBANA, OHIO.

PLANTER.

Application filed January 22, 1926. Serial No. 83,052.

This invention relates to planters and has special reference to planters of that type, for planting corn and other seed, in which ground opening devices, for forming the trench in which the seed is dropped, are arranged in advance of seed dropping and covering devices, one object of the present invention being to provide simple, reliable and efficient means for relatively adjusting the ground opening and seed dropping devices as required for deep or shallow planting or to otherwise suit the nature of the ground or other conditions.

Another object of the invention is to provide a double row planter in which the working devices at opposite sides of the planter are adjustable for the purposes described as well as to vary the distance between the rows.

Still another object of the invention is to provide a planter which will furrow hard as well as soft ground and plant level as well as unlevel ground at a uniform depth.

With these and other objects in view, the invention consists of the features of construction, combination and arrangement of parts, hereinafter fully described and claimed, reference being had to the accompanying drawings, in which:—

Figure 1 is a top plan view of a planter embodying my invention, parts unnecessary to a disclosure of the invention being omitted.

Figure 2 is a side elevation of the same.

Figure 3 is a sectional side elevation on an enlarged scale of a portion of the tilting front frame, one of the seed chutes and coacting seed planting device.

Figure 4 is a rear elevation of the same.

Figure 5 is a top plan view of the parts illustrated in Figures 3 and 4, showing, in horizontal section, the fastening connections between the same and the tilting front frame.

Figure 6 is a sectional plan view on line 6—6 of Figure 3.

Figure 7 is a vertical transverse section on line 7—7 of Figure 3.

Figure 8 is a similar section on line 8—8 of Figure 3.

In carrying my invention into practice, I provide a main frame 1, of rectangular or oblong rectangular form, and having the forward ends of its side bars 2 provided with downturned bracket arms 3. A transverse shaft or axle 4 is journaled upon said side bars 2 immediately in rear of the transverse center of said frame and upon this shaft or axle are mounted ground wheels 5. These wheels are arranged in pairs at each side of the frame, the wheels of each pair being close to but in spaced relation to each other. The spacing of each pair of wheels in practice is such that they will come on opposite sides of a furrow formed by the furrow forming devices at each side of the machine in a planter of double type, as shown. The wheels are fixed to the axle, which is journaled to rotate in suitable bearings, and the mounting of the wheels is such that they may be adjusted along the axle and fixed in position thereon, to regulate the working distance between the wheels of each pair, as well as to regulate the working distance between the wheels of both pairs, so that the width or distance between the rows to be planted may be varied.

Arranged above the forward portion of the main frame 1 is an auxiliary frame 6 of oblong rectangular form and including a pair of transverse bars 7 and 8, the side bars of which frame are provided at their forward ends with depending bracket arms 9 pivotally engaging the bracket arms 3 of the main frame, as indicated at 10, whereby the auxiliary frame 6 is mounted to tilt vertically upon the main frame. To this auxiliary frame 6 the draft tongue or other suitable draft device 11 may be attached.

Supported at each side of the auxiliary frame 6 upon the bars 7 and 8 is a hopper 12 having any suitable type of seed dropping mechanism, the seed dropping mechanisms of the hoppers being operative in practice from a transverse shaft 13 driven from the axle 4 by suitable driving mechanism, generally indicated at 14, and which may be of chain and sprocket type. Associated with each hopper 12 is a downwardly and rearwardly extending hollow shank 15 forming a seed chute, the upper end of which shank carries bracket members 16 and 17 of similar construction and arranged one in advance of the other, said bracket members being provided with ears 18 to which the associated overlying hopper 12 is bolted. The bracket members 16 and 17 are arranged to lie in abutting contact with the frame bars 7 and 8 and are perforated for the passage of bolts 19 adapted for engagement with series of openings 20 in said bars 7 and 8, the construction being such that the hoppers and their chutes may be adjusted laterally of the auxiliary frame with relation to each other and to accord with specified adjustments of the wheels 5, so that the distance between rows may be varied.

Arranged beneath the forward portion of the main frame for coaction with the planting mechanism at each side thereof is an L-shaped shank 21 composed of a pair of spaced bars or metallic strips, the lower horizontal arm of said shank being pivoted, as indicated at 22, to the shank 15 to swing vertically thereon, while the vertical arm members of said shank 21 are provided with series of registering openings 23 for the passage of a connecting bolt 24. The said apertured ends of the vertical arms of the shank 21 are arranged to straddle a bracket bar 25 on the frame 6, through which bar the bolt 24 also passes, thereby pivotally and vertically adjustably connecting the hanger 21 to said bar and consequently to the tilting frame 6. The bar 25 is provided with angularly bent front and rear ends 26 and 27, and the angularly bent front end of said bar is apertured for passage of bolts 28 adapted for engagement with openings 29 in the front cross bar 30 of the frame 6, while the angular rear end 27 of the bar 25 is perforated for engagement with one of the bolts 19 passing through the bar 8, the construction thus being such that the shank 21 may be adjusted laterally of the frames 1 and 6 with the associated hopper 12 and seed chute or shank 15. The lower horizontal arm of the shank 21 carries ground opening devices of suitable type to cut a furrow in either hard or soft ground. The devices shown in the present instance consist of a furrow opening cutter disk 31 and a furrow opening shoe or shovel 32, in connection with which a lister blade 33 may be employed at each side of the disk 31 which blades may be set at suitable working angles for ground leveling actions. The parts 32 and 33 may be adjustably mounted on the standard 21 and all three parts 31, 32 and 33 are adjustable vertically to regulate their working depth by the adjustable connection of the shank 21 with the tilting frame 6.

The shank or shoe 15 carries at its lower end a seed depositing shoe or runner 34 formed of blades or plates 35 between which the lower end of the shank enters, said blades or plates having lapping front ends 36 and diverging rear ends 37, said lapping front ends 36 being suitably joined and formed to provide an upturned hanger arm 38 provided with a plurality of openings 39. The blades or plates of the shoe are rigid with the shank 15, the shoe being therefore vertically and laterally adjustable with the shank but otherwise fixed with relationship thereto.

In the operation of the planter, the cutters carried by the shanks 21 form the furrows, and the shoes 34 of the seed dropping and covering devices carried by the shanks 15 travel in these furrows and deposit the seed therein, it being obvious from the foregoing description that, through the described adjustment of the parts, the working elevation of the cutters and shoes may be varied and the distance between the cutters and shoes at each side of the planter changed whenever it is desired to vary the distance between the rows. For the purpose of covering the seed and closing the furrow formed at each side of the planter, a covering device composed of blades or plates 40 is provided for cooperation with each shoe 34. These blades have attaching arms 41 disposed in converging relationship and perforated for the passage of a bolt 42 adapted to be passed through any one of the openings 39 in the upturned hanger arm 38 of the shoe 34, whereby the forward end of the covering device may be adjusted for a vertical adjustment of the covering blades as a whole, the bolt 42 also serving as a pivotal support on which the covering blades may be tilted upwardly or downwardly. The covering blades lie on opposite sides of the shoe 34 and extend rearwardly thereof and have inwardly curved rear ends 43 forming rake like members for moving the earth inwardly and covering the seed and closing the furrow. Each blade 40 is provided at or about a medial point with a U-shaped bracket 44, one arm of which is riveted or otherwise suitably fixed thereto as indicated at 45, and the other arm of which has a fastening connection with the portion 37 of the adjacent shoe blade 35, said arm being provided with a series of openings 46 for the passage of a bolt 47, whereby an adjustable connection between the parts mentioned is afforded. The front and rear attaching connections between the covering blades and the shoe adapt the covering blades to be adjusted bodily to different working elevations and also adapt them to be tilted upwardly or downwardly on the pivotal connection 42, according to the working depth of the shoe 34, so that their seed covering and furrow closing action may be regulated as desired, that is to say, to cover the deposited seed as lightly or heavily as desired and as occasion may require under different conditions of service.

The front portions of the lower edges of the blades 40 are cut away on downwardly and rearwardly curved lines, as at 48, beneath the arms 41 and for a distance in rear thereof, these cutaway portions of each blade forming a throat or earth entranceway to the passage between the blade 41 and adjacent side or plate 35 of the shoe 34, such throats thus gaging and regulating the amount of earth admitted to cover the seed, which gaging action may be further regulated by vertical body or tilting adjustments of the covering blades so that the exact depth of earth to be laid over the seed, and no more, may be passed for the covering operation, all excess earth being diverted outwardly beyond the lines of travel of the covering blades. It will be noted that each shoe and its associated furrow coverer are located between a pair of ground wheels and are adjustable with relation to the ground engaging surfaces of said wheels. By this arrangement the wheels themselves will also serve as depth gages and guides operative, as they travel over rolling and irregular ground surfaces, and because of the set and gaged relationship of the shoe and coverers with respect thereto, to ensure the deposit of the seed at a uniform depth throughout, the coverers gaging the depth of the earth to be filled in over the seed. This is of importance in planting seed for a sure deposit and successful germination and in obtaining a proper yield, this method of positively planting the seed at a predetermined depth beneath ground engaging wheels and covering the seed to a uniform degree preventing irregular depth planting and the losses in time, labor and yield occasioned thereby.

Any suitable means may be provided for tilting the frame 6 and holding it in the desired position of adjustment. As shown in the present instance, a lever 49 mounted on frame 1 is provided for the purpose, said lever being coupled by an arm 50 with the frame 6, whereby the latter may be tilted, and provided with a dog or pawl 51 to engage a rack 52, whereby it may be locked in adjusted position.

It will, of course, be understood that the seed feed mechanism employed may be any of those in common use or of any suitable construction, the invention not being limited in this particular. Also that while the construction shown as embodying my invention is preferred, many changes falling within the spirit of the invention and scope of the appended claims may be made without departing from or sacrificing any of the advantages of the invention.

Having thus fully described my invention, I claim:—

1. In a planter, a main frame, an auxiliary frame overlying the forward portion of the main frame and pivoted at its forward edge to the forward edge of the main frame for tilting motion in a vertical plane, hoppers mounted upon the auxiliary frame at opposite sides of the planter, chutes extending at a downward and rearward angle of inclination from the auxiliary frame and communicating at their upper end with the hoppers and provided at their lower ends with furrow closing means, means for tilting the auxiliary frame and vertically adjusting said chutes and furrow closing means, a shank at each side of the planter having a horizontal arm pivoted to the adjacent chute and a vertical arm adjustably connected with the auxiliary frame, and furrow forming means carried by the horizontal arm of the shank and lying in advance of the adjacent chute and its furrow closing means and adjustable vertically through the pivotal connection of the shank with the chute and adjustable connection of said shank with the auxiliary frame.

2. In a planter, a main frame, an auxiliary frame overlying the forward portion of the main frame and pivoted at its forward edge to the forward edge of the main frame for tilting motion in a vertical plane, hoppers at opposite sides of the auxiliary frame, chutes carried by and depending from the auxiliary frame and communicating with said hoppers, said hoppers and chutes being adjustable laterally upon the auxiliary frame to vary the space between them, furrow covering means carried by the chutes, shanks pivoted at their lower ends to the chutes and connected at their upper ends to the auxiliary frame for vertical adjustment, said upper ends of the shanks being also laterally adjustable on the auxiliary frame with the hoppers and chutes, and furrow forming means carried by the shanks.

3. In a planter, a main frame, an auxiliary frame pivotally supported by the main frame for tilting movements in a vertical plane, means on the main frame for tilting the auxiliary frame and locking the same in adjusted position, chutes at opposite sides of the planter provided at their upper ends with brackets adjustably engaging the auxiliary frame to vary the spacing between the chutes, hoppers mounted upon said brackets and adjustable with the chutes, bracket bars upon the auxiliary frame lying in advance of the hoppers and adjustable laterally on said auxiliary frame, furrow covering means carried by the chutes, shanks having lower ends pivotally connected with the chutes and upper ends adjustably connected with said bracket bars, and furrow forming means carried by the shanks.

In testimony whereof I affix my signature.

LONZO R. HUPP.